*John A Burnap's Impt in Friction Rollers*
PATENTED
DEC 10 1867
71973
Fig. 1
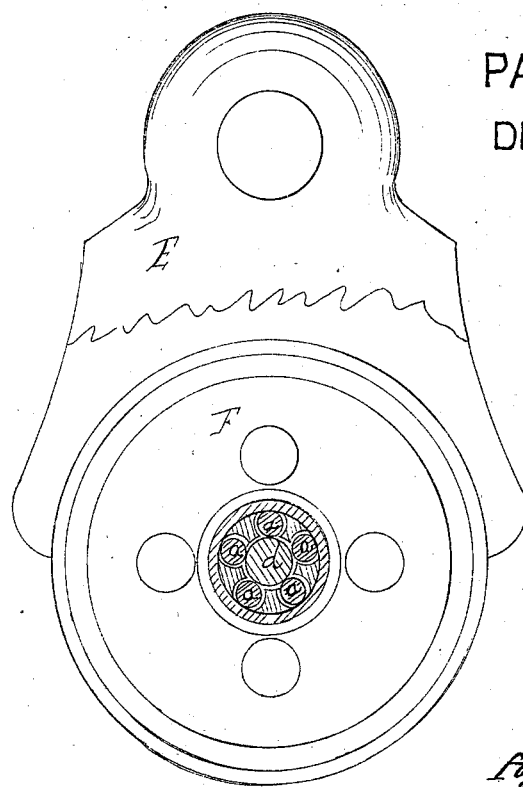
Fig. 2
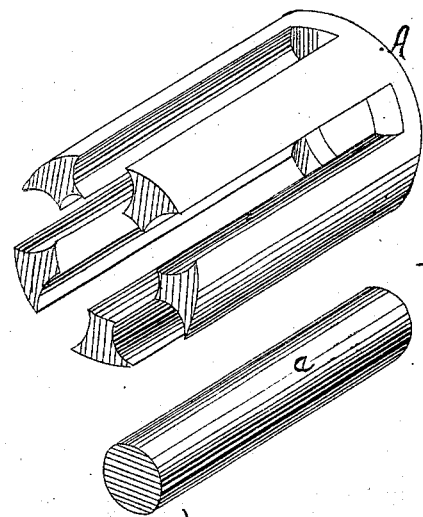
Fig. 3
Witnesses
Inventor
John A. Burnap
per
Alexander H Mason
Atty

United States Patent Office.

JOHN A. BURNAP, OF ALBANY, NEW YORK.

Letters Patent No. 71,973, dated December 10, 1867.

IMPROVEMENT IN PULLEY-BLOCK.

*The Schedule referred to in these Letters Patent and making part of the same.*

TO ALL WHOM IT MAY CONCERN:

Be it known that I, JOHN A. BURNAP, of Albany, in the county of Albany, and in the State of New York, have invented certain new and useful Improvements in Friction-Rollers; and do hereby declare that the following is a full, clear, and exact description thereof, reference being had to the accompanying drawings and to the letters of reference marked thereon.

In the annexed drawings, making part of this specification, $a\ a$ represent the friction-rollers, which are made of cast iron, and are left unturned, thereby preserving the hard surface or scale, which is more durable than any turned surface. As these rollers are not to be turned, their hardness may be increased by casting them in chills. A represents a frame, which is cast of any suitable metal, and used for the purpose of holding in place the friction-rollers $a\ a$. This frame is in cylindrical form, and about as long as the depth of the eye of the pulley, but instead of being cast solid, is formed as follows: I take a hollow cylinder and cut a series of grooves in it, from near one end to the other, said grooves extending through the cylinder, from its periphery to its centre opening, thus leaving a series of arms, supported at only one end. These arms are made with concave or plane sides, or they may be cylindrical, and the rollers $a\ a$ are to be placed between them, or if the arms are cylindrical they may be reduced in size, and the rollers, cast hollow, may be placed upon them. This frame may be inserted in the eye of the pulley F, being made to work easily in it. The bolt or pin $d$, which confines the pulley to the block, is then passed through the cylinder or frame, and secured by a nut or other device. The periphery of the rollers projects to or beyond the periphery of the frame, and also to or beyond the inner faces or sides of the arms, so that when the pulley is in position for work, the rollers bear against the eye of the pulley, and also upon the bolt or pin $d$. The pulley runs with great ease by this arrangement, and the rollers are always held apart and in proper position. This frame may be cast, as are the rollers, and both may be inserted in the pulley at very little cost.

Having thus fully described my invention, what I claim as new, and desire to secure by Letters Patent, is—

The arrangement of the frame E and pulley F, through the eye of which is inserted the frame A, having a series of rollers, $a\ a$, the whole constructed and used substantially as specified.

In testimony that I claim the foregoing, I have hereunto set my hand, this 11th day of October, 1867.

JOHN A. BURNAP.

Witnesses:
ABRAHAM V. DE WITT,
JAMES H. MELICK.